United States Patent
Duesterwald et al.

(10) Patent No.: US 6,813,705 B2
(45) Date of Patent: Nov. 2, 2004

(54) MEMORY DISAMBIGUATION SCHEME FOR PARTIALLY REDUNDANT LOAD REMOVAL

(75) Inventors: Evelyn Duesterwald, Somerville, MA (US); Vasanth Bala, Sudbury, MA (US); Sanjeev Banerjia, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 695 days.

(21) Appl. No.: 09/755,774

(22) Filed: Jan. 5, 2001

(65) Prior Publication Data

US 2001/0032306 A1 Oct. 18, 2001

Related U.S. Application Data

(60) Provisional application No. 60/184,624, filed on Feb. 9, 2000.

(51) Int. Cl.$^7$ .............................................. G06F 12/00
(52) U.S. Cl. ..................................................... 712/216
(58) Field of Search ......................................... 712/216

(56) References Cited

U.S. PATENT DOCUMENTS

| 5,537,620 | A | * | 7/1996 | Breternitz, Jr. ............. 717/160 |
| 5,542,075 | A | * | 7/1996 | Ebcioglu et al. ............ 717/151 |
| 5,854,933 | A | * | 12/1998 | Chang ........................ 717/158 |
| 6,202,204 | B1 | * | 3/2001 | Wu et al. .................... 717/151 |
| 6,658,559 | B1 | * | 12/2003 | Arora et al. ................. 712/245 |

OTHER PUBLICATIONS

Bob Cmelik, et al.: "Shade: A Fast Instruction–Set Simulator for Execution Profiling"; SIGMETRICS 94–5/94; pp 128–137.

Thomas Ball, et al.; "Branch Prediction for Free", ACM-SIGPLAN–PLDI–6/93; pp 300–313.

Thomas Ball, et al.; "Efficient Path Profiling"; 1072–4451/96 IEEE; pp 46–57.

* cited by examiner

Primary Examiner—Eric Coleman

(57) ABSTRACT

An optimization scheme used at run-time or compile-time is capable of identifying partially redundant loads and determining whether the load is truly redundant. The truly redundant load may be replaced with a register copy instruction to reduce the memory traffic and save CPU cycle time.

20 Claims, 7 Drawing Sheets

MEMORY DISAMBIGUATION SCHEME FOR PARTIALLY REDUNDANT LOAD REMOVAL

RELATED APPLICATIONS

This application claims priority to provisional U.S. application Ser. No. 60/184,624, filed on Feb. 9, 2000, the content of which is incorporated herein in its entirety.

FIELD OF THE INVENTION

The present invention relates generally to memory traffic optimization, and more particularly to a system and method for removing a partially redundant load arising across a sequence of blocks.

BACKGROUND OF THE INVENTION

With the increase in the gap between memory access time and CPU performance comes an increased interest in optimizations that reduce memory traffic. The removal of redundant load instructions is an example of a memory traffic optimization. A load to a register is redundant if it is preceded by a store that writes to the same address and the stored value has not been overwritten by another store prior to the load. As shown in FIG. 1A, a load instruction 20 loads a value into a register gr5 from a memory location whose address is computed as the sum of the value held in a base register gr2 and a displacement value, i.e., 16(gr2). The load 20 is redundant because it is preceded by a store 10 that writes the value in register gr1 to the same address, i.e., 16(gr2), and the stored value is not overwritten by another store prior to the load 20.

The redundant load can be removed by replacing it with an appropriate register copy instruction. As shown in FIG. 1B, the load 20 is replaced by a register copy 30, which copies the value of register gr1 into register gr5. This replacement results in a vast improvement in memory cycle time. Whereas a load instruction may take as many twenty to thirty memory cycles to complete, a register copy instruction may take only one or two.

Often a load instruction is redundant in some but not all instances of the load. There exists a set of program paths along which the load is redundant and a set of paths along which the load is not redundant. Such a load is called a "partially redundant" load. FIG. 2A shows an example of a load that is redundant only along one path. As shown in FIG. 2A, a joint point 25 funnels both the store instruction 10 and an instruction 40 to the load instruction 20. Although the store instruction 10 and the load instruction 20 are redundant, the instruction 40 and the load instruction 20 may not be. As a result, the load instruction 20 cannot necessarily be replaced with a copy instruction 30.

Previous approaches for removing partially redundant loads require that the set of paths along which the load is redundant can be statically determined. A number of compile-time strategies have been developed to remove partially redundant instructions by sometime expensive code transformations. The idea is to isolate the execution paths along which the load is redundant via code duplication and/or code motion. Enough copies of the load are generated such that along each path the load is either fully redundant (in which case it can be eliminated) or not redundant at all.

Previous techniques to remove partially redundant loads are based on two important assumptions that limit their effectiveness. First, the techniques are compile-time approaches that operate on some intermediate form. Second, all previous techniques require that the set of instances in which a partially redundant load is truly redundant can be statically determined.

The first assumption implies that all redundant loads that are created during register allocation and code generation (that is, after compile-time optimizations have been applied) will be missed. While it is conceptually possible to apply the compile-time techniques to object code, the code transformations that are required are too substantial to be implemented after code generation since they might end up requiring a complete re-generation of the code.

The second assumption is more severe. Even if only a single path is considered, it may not be possible to determine whether a load is redundant or not, due to the inability to disambiguate memory references statically. Consider the example in FIG. 2B. Even after isolating the path of instructions 10, 50 and 20, it cannot be determined whether the load 20 is redundant due to the intervening store 50. While path transformations are useful to isolate single paths, they do not help in exposing redundancies of the form of FIG. 2B. The cause of the problem is that these redundancies involve an intervening memory reference that cannot be statically disambiguated.

SUMMARY OF THE INVENTION

Briefly, a method for optimizing instructions in a program consistent with the present invention identifies a series of instructions in which a first instruction either stores a value in a first register into a first memory location or loads a value from the first memory location into the first register, a second instruction subsequent to the first instruction stores a value in a second register into a second memory location, and a third instruction subsequent to the second instruction loads a value from the first memory location into a third register. A fourth instruction is inserted between the second and third instruction which copies the value in the first register into the third register. It is determined if the first memory location and the second memory location are the same, and the third instruction is conditionally executed depending on a result of the determination.

In another aspect of the invention, the third instruction is executed if the first and second memory locations are the same and is nullified if the first and second memory locations are different. In yet another aspect of the invention, the insertion of the fourth instruction is done during compile-time or during run-time. The determination may be made during run-time.

In another aspect of the invention, a fifth instruction is inserted between the fourth instruction and the third instruction which compares the first memory location and the second memory location, wherein the fifth instruction nullifies the third instruction if the first memory location and the second memory location are different.

In yet another aspect of the invention, a method for optimizing instructions in a program identifies a series of instructions in which a first instruction either stores a value in a first register into a first memory location or loads a value from the first memory location into the first register, a second instruction subsequent to the first instruction stores a value in a second register into a second memory location, and a third instruction subsequent to the second instruction loads a value from the first memory location into a third register. The third instruction is replaced with a fourth instruction copying the value in the first register into the third register if the first memory location and the second memory location are different or if the third instruction is a redundant load.

DETAILED DESCRIPTION OF THE PREFERRED EMBODIMENT

Consistent with the present invention, a partially redundant load within a fragment may be removed. Fragments are single-entry multi-exit dynamic sequences of blocks, where a block is a branch-free sequence of code that terminates with a branch. The identification and removal of partially redundant loads within a fragment may be done statically in the compiler or dynamically during run-time, such as with a caching dynamic translator.

Caching dynamic translators attempt to identify program hot spots (frequently executed portions of the program, such as certain loops) at run-time and use a code cache to store translations of those frequently executed portions. Subsequent execution of those portions can use the cached translations, thereby reducing the overhead of executing those portions of the program. These frequently executed portions are fragments, i.e., single-entry multi-exit sequences of blocks.

To identify fragments and store them in a code cache, the caching dynamic translator uses traces. Traces may pass through several procedure bodies, and may even contain entire procedure bodies. Traces offer a fairly large optimization scope while still having simple control flow, which makes optimizing them much easier than a procedure. Simple control flow also allows a fast optimizer implementation. A dynamic trace can even go past several procedure calls and returns, including dynamically linked libraries (DLLs). This allows an optimizer to perform inlining, which is an optimization that removes redundant call and return branches, which can improve performance substantially.

Figure 3:
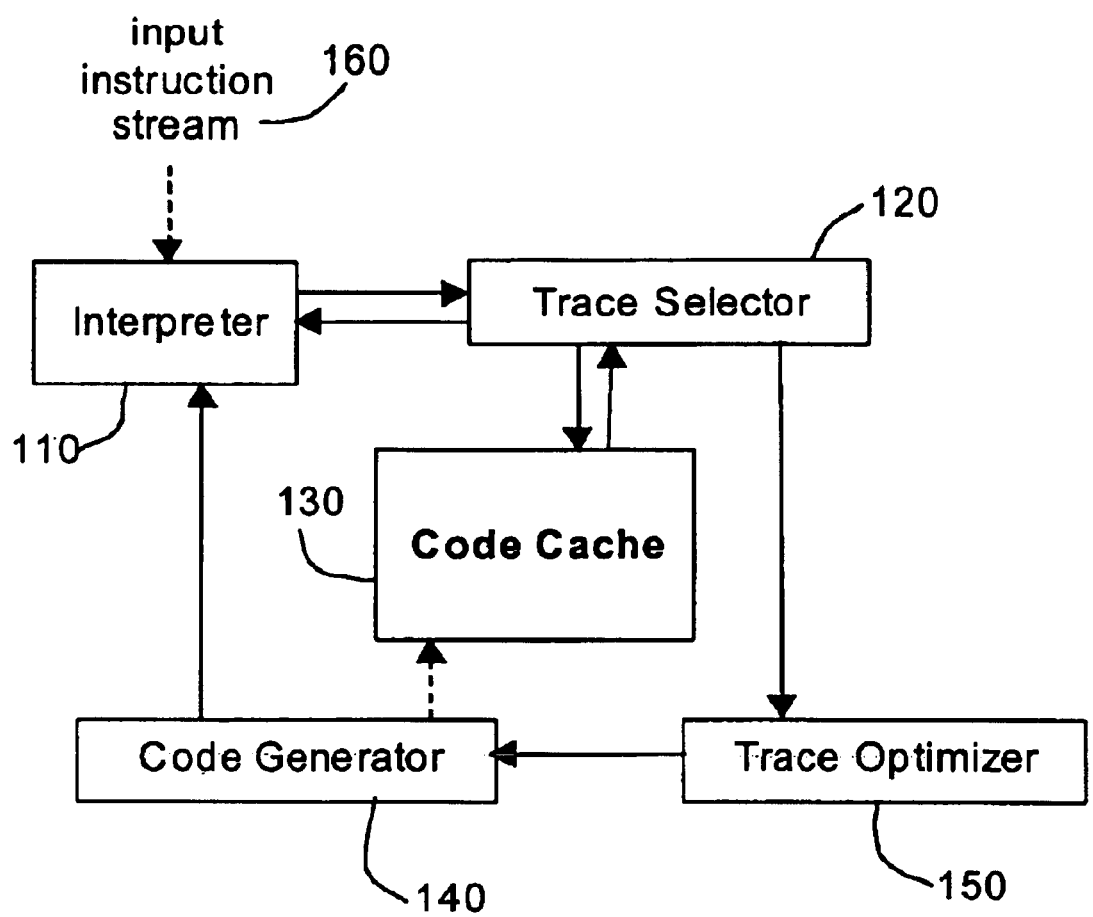
FIG. 3 shows a block diagram of a dynamic translator consistent with the present invention.

Referring to FIG. 3, a dynamic translator includes an interpreter 110 that receives an input instruction stream 160. This "interpreter" represents the instruction evaluation engine; it can be implemented in a number of ways (e.g., as a software fetch—decode—eval loop, a just-in-time compiler, or even a hardware CPU).

In one implementation, the instructions of the input instruction stream 160 are in the same instruction set as that of the machine on which the translator is running (native-to-native translation). In the native-to-native case, the primary advantage obtained by the translator flows from the dynamic optimization 150 that the translator can perform. In another implementation, the input instructions are in a different instruction set than the native instructions.

The trace selector 120 identifies instruction traces to be stored in the code cache 130. The trace selector is the component responsible for associating counters with interpreted program addresses, determining when to switch between the interpreter states, i.e., between normal and trace growing mode, and determining when a "hot trace" has been detected.

Much of the work of the dynamic translator occurs in an interpreter—trace selector loop. After the interpreter 110 interprets a block of instructions (i.e., until a branch), control is passed to the trace selector 120 to make the observations of the program's behavior so that it can select traces for special processing and placement in the cache. The interpreter—trace selector loop is executed until one of the following conditions is met: (a) a cache hit occurs, in which case control jumps into the code cache, or (b) a hot start-of-trace is reached.

When a hot start-of-trace is found, the trace selector 120 switches the state of the interpreter 110 so that the interpreter emits the trace instructions until the corresponding end-of-trace condition (condition (b)) is met. A start-of-trace condition may be, for example, a backward taken branch, procedure call instructions, exits from the code cache, system call instructions, or machine instruction cache misses. An end-of-trace condition may be, for example, when a certain number of branch instructions have been interpreted since entering the grow trace mode, a backward taken branch is interpreted, or a certain number of native translated instructions has been emitted into the code cache for the current trace.

After emitting the trace instructions, the trace selector 120 invokes the trace optimizer 150. The trace optimizer 150 is responsible for optimizing the trace instructions for better performance on the underlying processor. After optimization is completed, the code generator 140 emits the trace code into the code cache 130 and returns to the trace selector 120 to resume the interpreter-trace selector loop.

Figure 1A:
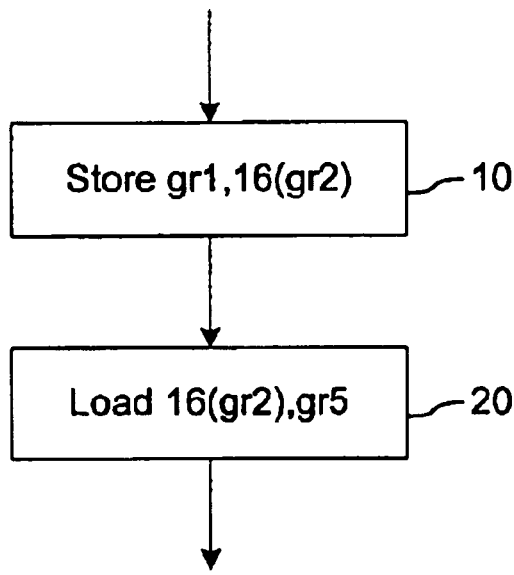
FIG. 1A is a diagram of an example of a redundant load.
Figure 1B:
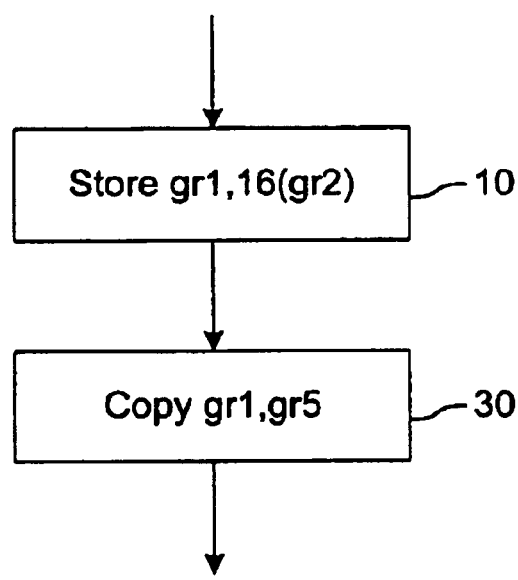
FIG. 1B is a diagram of the example of FIG. 1A replacing the redundant load with a register copy.
Figure 2A:
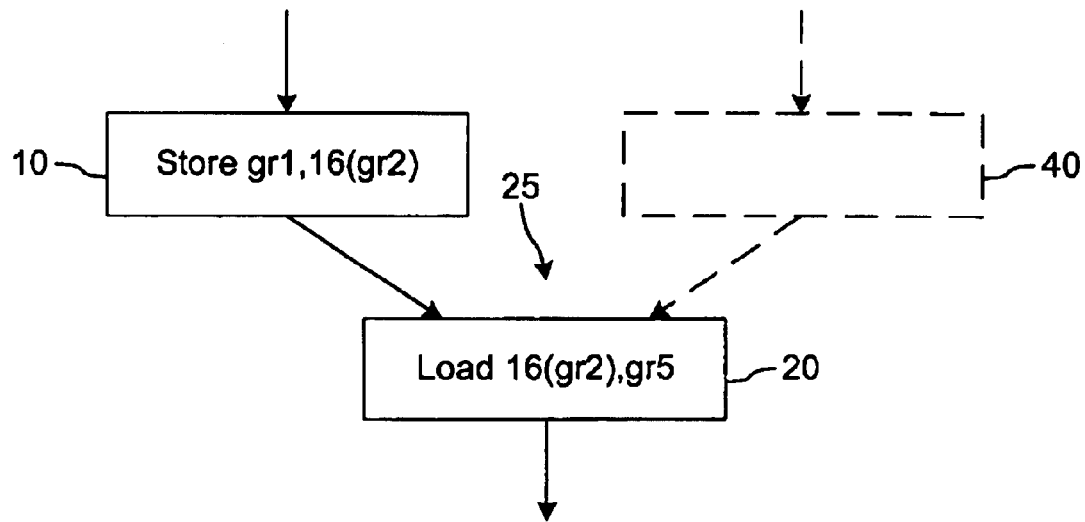
FIGS. 2A and 2B are diagrams of examples of partially redundant loads.
Figure 2B:
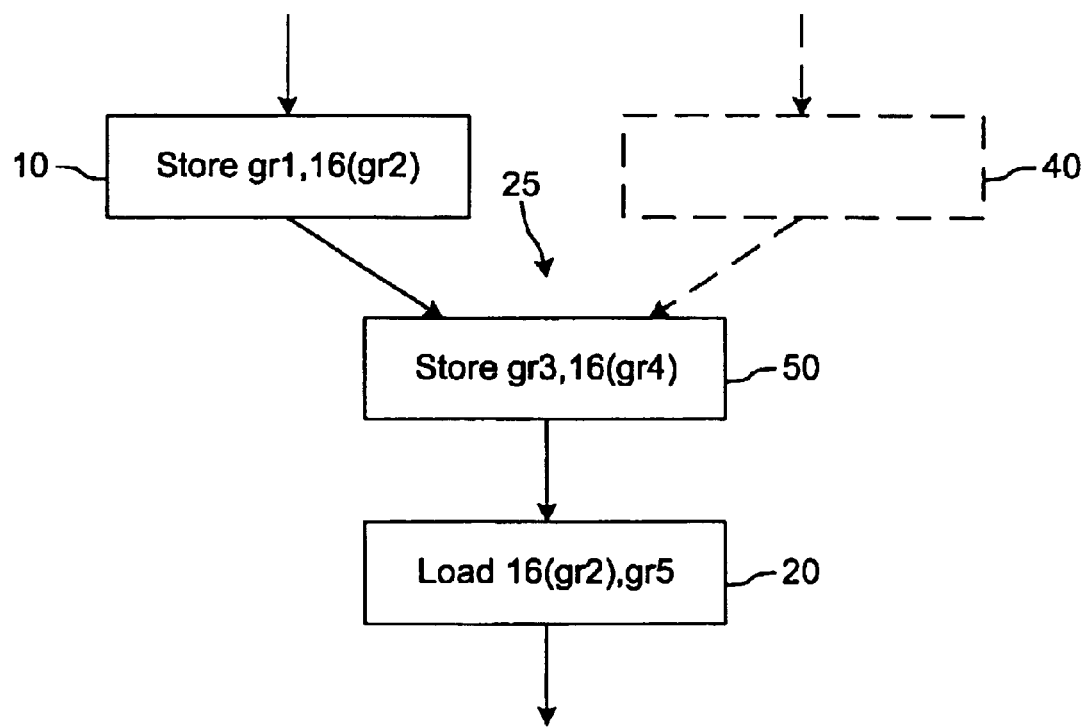

One of the optimizations that is possible in the context of a caching dynamic translator with the trace optimizer 150 is the removal of redundant loads, such as shown in FIG. 1A. In addition to removing redundant loads, the trace optimizer can identify partially redundant loads, such as shown in FIGS. 2A and 2B, and remove them when appropriate. The process of identifying and removing partially redundant loads is discussed below.

In run-time using a caching dynamic translator, a fragment is built from a dynamic sequence of blocks. A caching dynamic translator naturally provides the capability for isolating individual program paths for optimization and therefore provides a useful context for removing partially redundant loads. In the static compiler context, however, some of the code may not be separated into individual paths, such as shown by the joint point 25 in FIG. 2A. To separate the code into individual paths, the code blocks after the joint point may be copied to create separate paths. As a result, there would be two separate paths, one for instructions 10 and 20, and one for 40 and 20.

Figure 4:
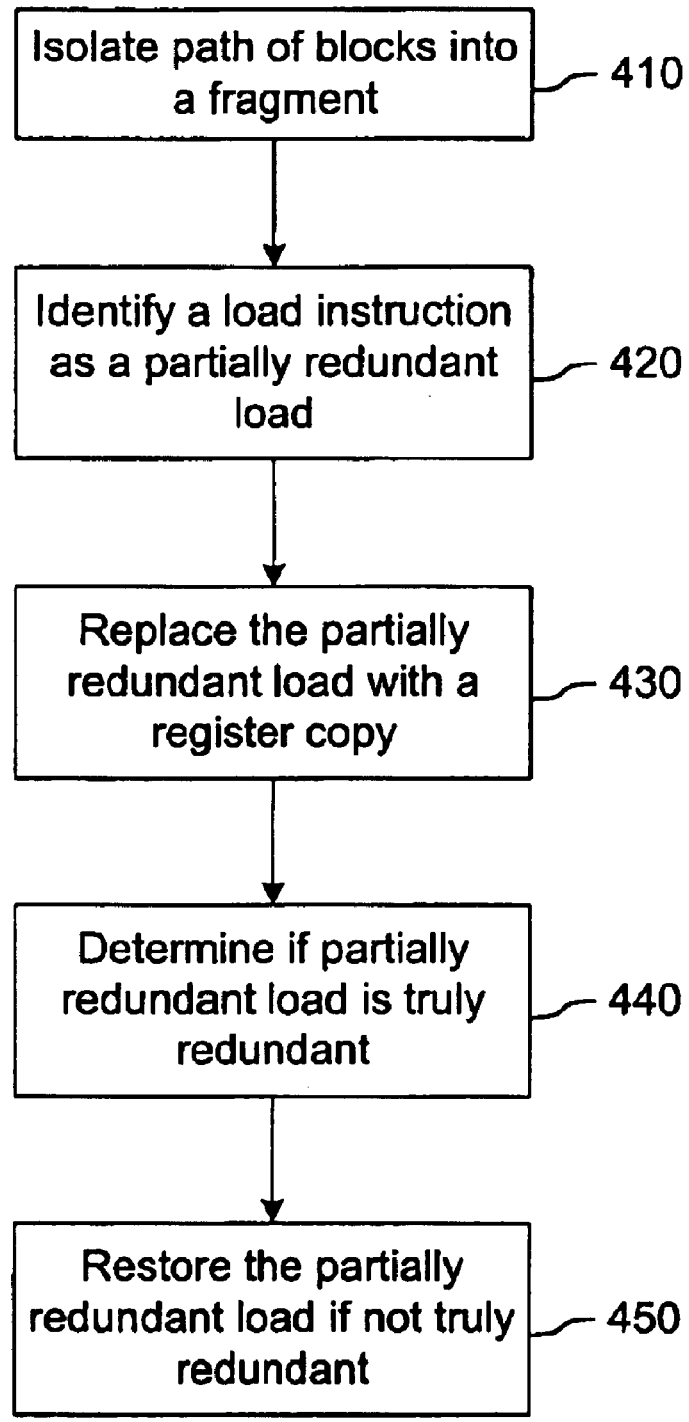
FIG. 4 is a flow diagram for identifying and removing partially redundant loads consistent with the present invention.
Figure 5A:
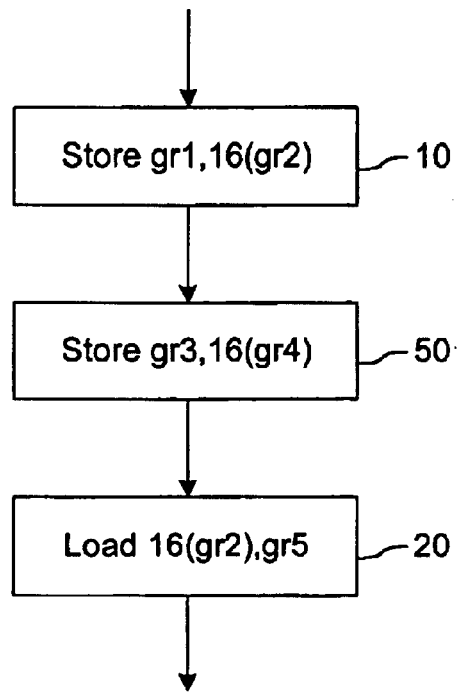
FIG. 5A is a diagram of a fragment having a partially redundant load.

FIG. 4 shows a flow diagram for identifying and removing partially redundant loads consistent with the present invention. As shown in FIG. 4, the first step is to isolate paths of code blocks into fragments (step 410). As discussed above, this isolation is achieved automatically by the operation of the caching translator. FIG. 5A shows an example of a fragment. The fragment in FIG. 5A includes a store instruction 10, a store instruction 50 and a store instruction 20.

After isolating the fragment, the fragment is analyzed to identify whether there is a load instruction that is partially redundant (step 420). To identify a partially redundant load instruction, a redundant load analysis of the fragment is performed. The redundant load analysis determines how register values are defined and used, and propagates information about the addresses from which the register values are read. Based on this information, the redundant load analysis can determine if there is a partially redundant load in the fragment.

FIG. 5A shows an example of a partially redundant load. In FIG. 5A, the load 20 is partially redundant because the store 50 intervenes between the store 10 and the load 20. If the store 50 stores the value in register gr3 in the same location that the store 10 stores the value gr1, the load 10 is not redundant. However, if the values are stored in different locations, the load 20 is in fact redundant and can be replaced. Although FIG. 5A shows a sequence of store-store-load, the load 20 would also be partially redundant if the store 10 was instead a load instruction, i.e. loading the value at 16(gr2) into the register gr1.

When a load is identified as being a partially redundant load, it is replaced with a register copy instruction (step 430). As will be explained below, the replacement with a register copy instruction is preferably done with a conditional execution of the partially redundant load. In particular, the replacement may insert the register copy instruction before the partially redundant lone and insert a guard instruction before the partially redundant load, which conditionally nullifies the partially redundant load. Since the steps of identifying a partially redundant load and replacing or inserting the register copy instruction is independent of whether the partially redundant load is truly redundant, which generally depends on addresses and register values that may change depending upon program input, these steps may be done statically at compile-time or dynamically at run-time.

Once the partially redundant load has been replaced, an analysis is performed to determine whether the partially redundant load is truly redundant (step 440). Since the determination of whether the load is truly redundant may rely upon program input, this analysis is preferably done at run-time. One way to make this determination is to disambiguate the memory locations which made the load partially redundant. Disambiguating means making a determination of whether the memory locations are the same or different. With reference to FIG. 5A, the determination would be made by disambiguating the store 10 and the store 50. If the memory locations are the same, the partially redundant load is not truly redundant. However, if the memory locations are different, the partially redundant load is truly redundant.

Figure 5B:
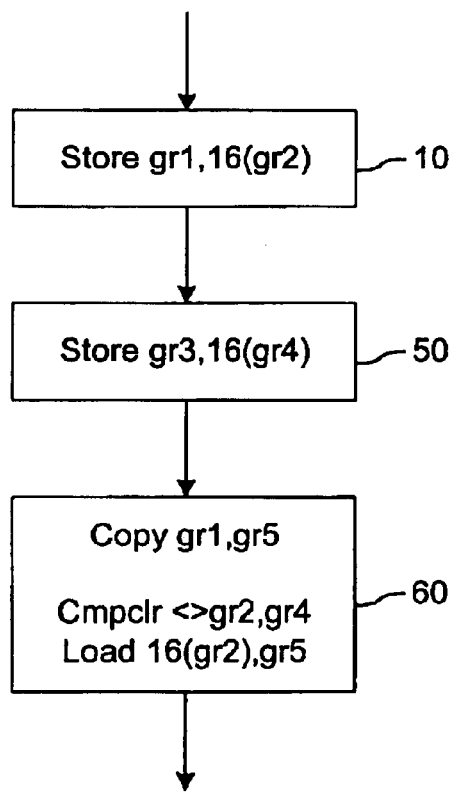
FIG. 5B is a diagram of the fragment shown in FIG. 5A modified to remove the partially redundant load.

As shown in FIG. 5B, the disambiguation of memory locations may be done by inserting a guard instruction between the register copy instruction and the partially redundant load. The guard instruction shown in FIG. 5B is a Cmpclr (compare and clear) instruction used in a PA-RISC architecture. However, any instruction which provides conditional execution may be used. The guard instruction compares addresses to determine if the addresses are different and conditionally nullifies the guarded instruction, i.e., the partially redundant load, based on a result of the guard instruction.

Based on the determination of whether it is truly redundant, the partially redundant load is restored (step 450). More specifically, if the partially redundant load is not truly redundant, then the original load instruction must be restored. However, if the partially redundant load is truly redundant, then the execution of the original load is suppressed. Referring to FIG. 5B, the Cmpclr instruction determines if the memory addresses of the store 10 and store 50 are different. If they are different, then the load is truly redundant and is nullified, However, if they are the same, then the partially redundant load is not truly redundant and is restored.

Figure 6:
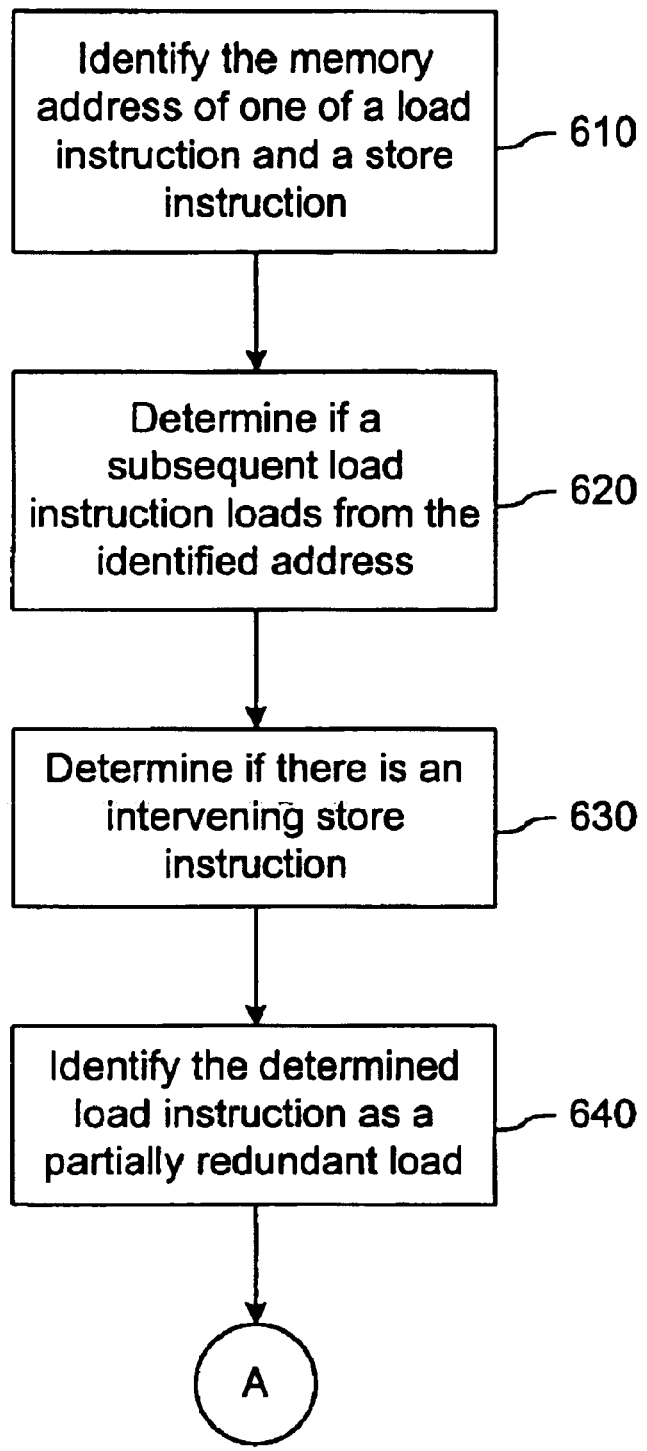
FIG. 6 is a flow diagram for identifying partially redundant loads in one aspect of the invention.

FIG. 6 shows a flow diagram for identifying a partially redundant load consistent with the present invention. As shown in FIG. 6, the first step is to identify a memory address accessed by either a load instruction or a store instruction in a fragment (step 610). The memory address may be identified by performing the redundant load analysis discussed above. With reference to FIG. 5A, the address 16(gr2) in the store 10 would be identified. In addition, a determination is made as to whether a subsequent load instruction loads from the identified address (step 620). This determination may also be made by performing the redundant load analysis discussed above. With reference to FIG. 5A, the load 20 loads from the address 16(gr2), which is the same as the address identified in the store 10.

It is then determined if there is a store instruction intervening between the instruction accessing the identified address and the subsequent load instruction loading from the identified address (step 630). This determination may similarly be made by performing the redundant load analysis, which identifies information about how register values are defined and used, and propagates information about the addresses from which the register values are read. If there is not an intervening store instruction, then the subsequent load instruction is truly redundant and can be replaced with a register copy instruction. However, if there is an intervening store instruction, the subsequent load instruction is identified as a partially redundant load (step 640). Referring to the fragment shown in FIG. 5A, the store 50 intervenes the store 10 and the load 20. Accordingly, the load 20 would be identified as a partially redundant load. As discussed above, the process of identifying a partially redundant load may be performed statically at compile-time or dynamically at run-time.

Figure 7:
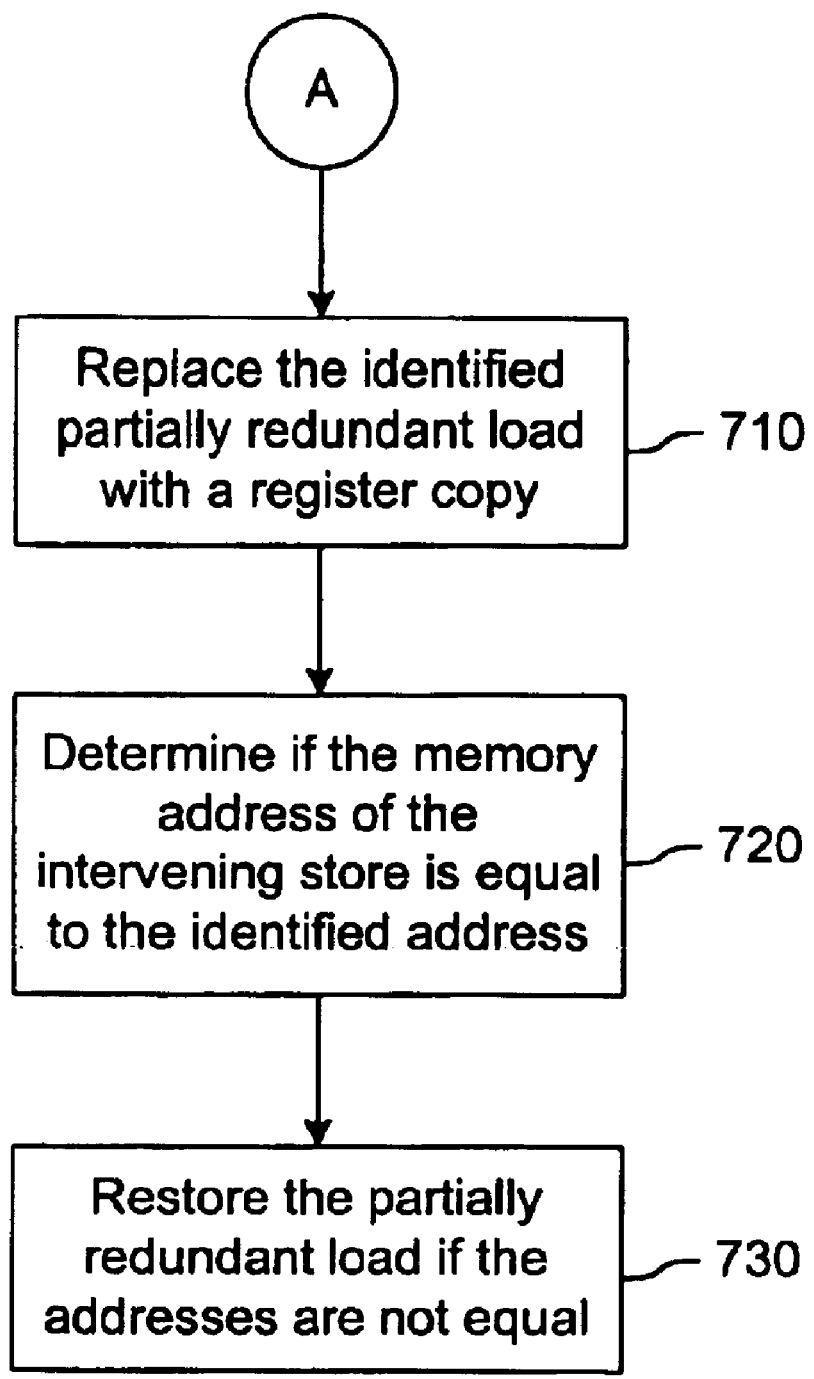
FIG. 7 is a flow diagram for modifying partially redundant loads in one aspect of the invention.

FIG. 7 shows a flow diagram for modifying a partially redundant load, consistent with the present invention. In one aspect of the invention, the process of FIG. 7 may be executed on a machine architecture that provides some form of conditional execution, such as conditional nullification in the PA-RISC architecture or in other architectures that provide support for predication. For the purposes of this description, a PA-RISC style conditional nullification is considered.

After identifying a partially redundant load, the identified load is replaced with a register copy instruction (step 710). As shown in FIG. 5B, the load 20 of FIG. 5A a register copy instruction is inserted in block 60 before the load 20. The replacement of the identified load with a register copy is an optimistic assumption that the partially redundant load is truly redundant. A guard instruction may also be inserted between the register copy instruction and the partially redundant load to conditionally nullify the load if it is truly redundant. As discussed above, the process of inserting a register copy instruction to conditionally replace a partially redundant load may be performed statically at compile-time or dynamically at run-time.

To determine if the partially redundant load is truly redundant, the memory address of the intervening store is compared to the memory address identified in step 610 to determine if they are equal (step 720). With reference to FIG. 5A, the memory address 16(gr4) of the intervening store 50 would be compared to the memory address 16(gr2) of the store 10.

If the addresses are not equal, then the partially redundant load is truly redundant, and the load is effectively replaced with the register copy. The load is effectively replaced by the register copy because the register copy instruction is executed and the load is not. However, if the addresses are equal, then the partially redundant load is not truly redundant, and the partially redundant load is restored (step 730).

To effect the comparison of the addresses, and restore the partially redundant load if they are equal, a guarded copy of the load may be inserted, as shown in block 60 of FIG. 5B. The execution of the load is guarded by a run-time disambiguation test that compares registers gr2 and gr4 for inequality. In the expected case that the test succeeds, i.e., the registers are not equal, the guarded load instruction will be nullified. Otherwise, it will be executed to load the correct value into register gr5. In a PA-RISC architecture, a Cmpclr instruction, which is shown in block 60 of FIG. 5B, may be used to conditionally nullify the following instruction based on the result of the comparison of the two registers. As shown in FIG. 5B, the following instruction is nullified if the contents of the registers are not equal.

The process of modifying partially redundant loads with a run-time disambiguation using the process of FIG. 7 is effective regardless of whether the accessed memory locations causing the partial redundancy may change, such as if the memory locations are dependent upon program input. With reference to FIG. 5A, if the value in gr2 is based on program input, however, then no static techniques would be able to disambiguate the memory references, and the load could not be removed statically at compile-time.

When relying only on static compile-time optimization techniques, many actually safe optimizations are disabled due to the inherent limitations of static analysis. To exploit these remaining optimization opportunities, some form of run-time information may be incorporated. Incorporating this run-time information into the static analysis at compile-time enables the compile-time optimization to use the process of FIG. 7 to remove partially redundant loads that are truly redundant.

The guarded optimization scheme discussed above enables the exploitation of optimization opportunities that use disambiguation of memory references that cannot be achieved by static means alone. Unlike previous redundant load removal techniques, the process for removing partially redundant loads consistent with the present invention may be designed to operate on object code, and thus does not miss redundant loads that are created by register allocation or code generation. Partial redundant load removal is based on the ability to isolate program paths along which the redundancy fully arises. A caching dynamic translator provides the path isolation automatically, and thus provides a useful context for implementing the partially redundant load removal process consistent with the present invention.

The guarded optimization scheme also results in savings in CPU cycle time. A typical memory instruction requires twenty to thirty CPU cycles to complete. In contrast, a register copy and the process of comparing the memory addresses by comparing the register values only requires a couple of CPU cycles to complete. When the compared register values are unequal, meaning that the partially redundant load is truly redundant, a significant number of CPU cycles are saved. Even when they are equal and the load is restored, only a few extra CPU cycles are added.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for optimizing instructions in a program, comprising:

identifying first and second instructions in which (A) a first memory location and a first register contain the same value preceding the first instruction, (B) the first instruction stores a value into a second memory location, and (C) the second instruction subsequent to the first instruction loads a value from the first memory location into a second register;

between the first instruction and second instruction, inserting a third instruction which copies the value in the first register into the second register;

determining if the first memory location and the second memory location are the same memory location; and conditionally executing the third instruction depending on a result of the determination.

2. A method according to claim 1, wherein the first memory location and the first register are determined to contain the same value because a preceding instruction either loaded the register from the memory location or stored the register to the memory location.

3. A method according to claim 1, wherein the second instruction is executed if the first and second memory locations are the same.

4. A method according to claim 1, wherein the second instruction is nullified if the first and second memory locations are different.

5. A method according to claim 1, wherein the insertion of the third instruction is done during compile-time.

6. A method according to claim 1, wherein the insertion of the third instruction is done during run-time.

7. A method according to claim 1, wherein the determination is made during run-time.

8. A method according to claim 1, wherein the inserting further comprises inserting a fourth instruction between the third instruction and the second instruction which compares the first memory location and the second memory location.

9. A method according to claim 8, wherein the fourth instruction nullifies the second instruction if the first memory location and the second memory location are different.

10. A method for optimizing instructions in a program, comprising:

identifying first and second instructions in which (A) a first memory location and a first register contain the same value preceding the first instruction, (B) the first instruction stores a value into a second memory location, and (C) the second instruction subsequent to the first instruction loads a value from the first memory location into a second register;

replacing the second instruction such that, a run-time determination is made as to whether the first and second memory locations are different, in which case, a register copy, rather than a load from memory, is executed.

11. A method according to claim 10, wherein the second instruction is replaced by a register copy, a test of the identity of the first and second memory locations, and a load from memory whose execution is conditioned on the test.

12. A computer readable medium on which is stored software for optimizing instructions in a program, including software to direct a computer to:

identify first and second instructions in which (A) a first memory location and a first register contain the same value preceding the first instruction, (B) the first instruction stores a value into a second memory location, and (C) the second instruction subsequent to the first instruction loads a value from the first memory location into a second register;

between the first instruction and second instruction, insert a third instruction which copies the value in the first register into the second register;

determine if the first memory location and the second memory location are the same memory location; and conditionally execute the third instruction depending on a result of the determination.

13. A computer readable medium according to claim 12, wherein the first memory location and the first register are determined to contain the same value because a preceding instruction either loaded the register from the memory location or stored the register to the memory location.

14. A computer readable medium according to claim 12, wherein the second instruction is executed if the first and second memory locations are the same.

15. A computer readable medium according to claim 12, wherein the second instruction is nullified if the first and second memory locations are different.

16. A computer readable medium according to claim 12, wherein the insertion of the third instruction is done during compile-time.

17. A computer readable medium according to claim 12, wherein the insertion of the third instruction is done during run-time.

18. A computer readable medium according to claim 12, wherein the determination is made during rum-time.

19. A computer readable medium according to claim 12, wherein the inserting further comprises inserting a fourth instruction between the third instruction and the second instruction which compares the first memory location and the second memory location.

20. A computer readable medium according to claim 19, wherein the fourth instruction nullifies the second instruction if the first memory location and the second memory location are different.

* * * * *